United States Patent [19]

Matsumoto et al.

[11] 4,371,713

[45] Feb. 1, 1983

[54] PROCESS FOR THE PREPARATION OF POLYETHER GLYCOL

[75] Inventors: Shuichi Matsumoto; Kenji Yasuda; Masayuki Endoh, all of Yokohama; Kunihiro Harada, Machida, all of Japan

[73] Assignee: Japan Synthetic Rubber Co., Ltd., Tokyo, Japan

[21] Appl. No.: 316,287

[22] Filed: Oct. 29, 1981

[30] Foreign Application Priority Data

Nov. 4, 1980 [JP] Japan .................... 55-153781
Nov. 6, 1980 [JP] Japan .................... 55-155184
May 29, 1981 [JP] Japan .................... 56-80997

[51] Int. Cl.$^3$ .................................... C07C 41/02
[52] U.S. Cl. ............................ 568/614; 568/617
[58] Field of Search ........................... 568/614, 617

[56] References Cited

U.S. PATENT DOCUMENTS

| | | | |
|---|---|---|---|
| 3,174,266 | 1/1973 | Matsuda et al. | 568/617 |
| 3,358,042 | 12/1967 | Dunlop et al. | 568/617 |
| 4,002,689 | 1/1977 | Tomomatsu | 568/617 X |
| 4,209,641 | 6/1980 | Masuda et al. | 568/617 |

*Primary Examiner*—Howard T. Mars
*Attorney, Agent, or Firm*—Oblon, Fisher, Spivak, McClelland & Maier

[57] ABSTRACT

In the process for preparing polyether glycol comprising (A) polymerizing tetrahydrofuran or a mixture of tetrahydrofuran and other copolymerizable cyclic ether(s) in the presence of a ring-opening polymerization catalyst comprising fuming sulfuric acid and/or fluorosulfuric acid as principal component, (B) adding water or an aqueous alkali solution to the polymerization product, and heating said reaction product under the strongly acidic condition to hydrolyze the same and (C) washing the hydrolysis product comprising polytetramethylene glycol and polyether glycol having oxytetramethylene groups as principal constituent, the polymerization of the tetrahydrofuran or the mixture of tetrahydrofuran and other copolymerizable cyclic ether(s) in the (A) step is carried out by (1) contacting the same with a ring-opening polymerization catalyst at a temperature within the range of −30° C. to 10° C. in the first stage, and (2) elevating the reaction temperature, when the conversion of said monomer into the polymer has reached 5% or more, to a temperature which falls within the range of 0° C. to 40° C. and is at least 10° C. higher than the reaction temperature in the first stage and continuing the polymerization at this temperature. This process enables the effective and easy preparation of a highly functional polyether glycol having a relatively low molecular weight of about 500 to 5,000 and comprising oxytetramethylene groups as principal constituent, said polyether glycol being useful as a starting material for the preparation of polyurethanes, elastomeric polyesters, elastomeric polyamides and the like.

14 Claims, No Drawings

PROCESS FOR THE PREPARATION OF POLYETHER GLYCOL

This invention relates to a process for the preparation of a polyether glycol, and more particularly the invention relates to a novel process for the effective and easy preparation of a highly functional polyether glycol having a relatively low molecular weight and comprising oxytetramethylene groups as principal constituent, said polyether glycol being useful as a starting material for the production of polyurethane, elastomeric polyesters, elastomeric polyamides and the like.

It is well known that polytetramethylene glycol (hereinafter referred to as PTMG) and a polyether glycol having oxytetramethylene groups as principal constituent (both PTMG and said polyether glycol being hereinafter referred to collectively as PTMG type polyether glycol) can be produced by polymerizing tetrahydrofuran alone or a mixture of tetrahydrofuran and other copolymerizable cyclic ether(s) in the presence of a ring-opening polymerization catalyst and then hydrolyzing the polymerization product. The industrial importance of said PTMG type polyether glycol has recently been spotlighted because this material, when used for the preparation of polyurethanes, elastomeric polyesters, elastomeric polyamides and the like, can provide products with many excellent properties such as mechanical properties and antihydrolytic property, and nowadays this material is widely used in many fields of industry. For application to such uses, said material is usually required to have a relatively low molecular weight of about 500 to 5,000 in terms of number-average molecular weight, and it is also important that said material is hydroxyl-terminated at both ends of the molecule, and in other words, it has a high functionality (close to 2). There are known various types of ring-opening polymerization catalysts for tetrahydrofuran, but the catalysts capable of easily providing the hydroxyl-terminated PTMG type polyether glycol with a relatively low molecular weight are limited to few examples. Use of fuming sulfuric acid or fluorosulfuric acid as such a ring-opening polymerization catalyst is already known (see, for example, Japanese Patent Publication Nos. 25438/73, 28917/74 and 3104/70). According to these methods using a catalyst comprising as main component a strongly acidic protonic acid, there can easily be produced a polymerization product having a number-average molecular weight of about 1,000 to 3,000, and it is also possible to easily obtain a hydroxyl-terminated PTMG type polyether glycol by hydrolyzing said polymerization reaction product under an acidic condition. However, these methods, when applied industrially, require use of a relatively large amount of the catalyst for obtaining a satisfactory conversion, and hence there are needed the large-scale facilities for the storage and handling of the catalyst. Furthermore, the release of a large amount of acids as waste material necessitates a great deal of labor and cost for their disposal. Such a large amount of the catalyst is required because the catalytic efficiency of said types of catalyst is low, resulting in an insufficient utilization of the catalyst added. Thus, the development of a method capable of improving the catalytic efficiency to allow the amount of the catalyst used to be decreased has been desired. Also, because these catalysts are strong protonic acid, a large amount of heat of mixing is evolved when the catalyst is contacted with tetrahydrofuran. Therefore, not only is it difficult to control the reaction temperature, but there are also caused undesirable phenomena such as coloration or decomposition of the polymerization product. In order to avoid such undesirable phenomena, the polymerization may be performed at a low temperature of not more than 0° C., but at such low temperatures, the polymerization rate is lowered to require a long time for the reaction. In addition, when the molecular weight of the polymerization product obtained is 1,000 or more, the entire polymerization system could be solidified to lose fluidity in a high-conversion operation, making it impossible to carry out such operations as stirring, transport, etc. Moreover, the polymerization at such low temperatures tends to produce a polymerization product with a relatively high molecular weight and it is extremely difficult to obtain a PTMG type polyether glycol having a molecular weight of 1,000 or less.

In view of these circumstances, the present inventors have conducted extensive research on the production of PTMG type polyether glycol, and have, as a result, found a novel process according to which the catalytic efficiency is markedly enhanced and the desired PTMG type polyether glycol can be produced at a high conversion without causing the coloration of the polymerization product and the solidification of the polymerization system.

An object of this invention is provide a process for producing a PTMG type polyether glycol having a number-average molecular weight of about 500 to 5,000, particularly 500 to 3,000, using fuming sulfuric acid or fluorosulfuric acid as a ring-opening polymerization catalyst, with a markedly enhanced catalytic efficiency. The term "catalytic efficiency" is here defined as the ratio of the number of moles of the PTMG type polyether glycol molecule obtained to the number of moles of the catalyst used for the polymerization, and the calculation formula thereof is shown in the Examples which appear hereinafter.

Another object of this invention is to provide a process capable of easily producing a PTMG type polyether glycol without causing any undesirable phenomena such as the coloration of the polymerization product, the solidification of the polymerization system at a high conversion, or the like.

Thus, according to the present invention, there is provided a process for preparing a polyether glycol which comprises (A) polymerizing tetrahydrofuran alone or a mixture of tetrahydrofuran and other copolymerizable cyclic ether(s) (both being hereinafter referred to collectively as tetrahydrofuran type monomer(s)) in the presence of a ring-opening polymerization catalyst comprising fuming sulfuric acid and/or fluorosulfuric acid as principal constituent, (B) adding water or an aqueous alkali solution to the polymerization product and heating the system under the strongly acidic condition to hydrolyze said polymerization product, and (C) washing the hydrolysis product comprising the PTMG type polyether glycol, characterized in that the polymerization of the tetrahydrofuran type monomer in the (A) step is carried out by (1) contacting the tetrahydrofuran type monomer with the ring-opening polymerization catalyst at a temperature within the range of −30° to 10° C. at the first stage and (2) elevating the reaction temperature, when the conversion of the tetrahydrofuran type monomer into the polymer has reached 5% or more, to a temperature which falls within the range of 0° C. to 40° C. and is at least 10° C.

higher than the reaction temperature at the first stage and continuing the polymerization at this temperature.

According to the process of this invention, the polymerization of the tetrahydrofuran type monomer is effected in the specific two stages, whereby the catalytic efficiency can be greatly increased, thereby reducing the amount of the catalyst used and the catalyst cost as well as the amount of waste acids produced in the preparation process, and also decreasing the load for the treatment thereof. Also, the process of this invention is not accompanied by the undesirable phenomena such as coloration of the polymerization product and solidification of the polymerization system at a high-conversion unlike the conventional methods, so that it is possible to produce very easily a PTMG type polyether glycol having a number-average molecular weight of about 500 to 5,000 which is most suited for the industrial uses. Since the process of this invention has thus many advantages, it is of extremely high industrial utility value. According to the conventional methods, particularly when using a catalyst comprising as principal component fuming sulfuric acid, the catalytic efficiency is low and also, because of high tendency of coloration of the polymerization product, the polymerization must be performed at a low temperature, which causes the problem of possible solidification of the polymerization system at a high conversion. For these reasons, the process of this invention proves to be particularly high in its utility value when applied to the polymerizations using a catalyst comprising, as principal component, fuming sulfuric acid.

The present invention is described in further detail below.

In the process of this invention, it is imperative that in the (A) step, the contact of the tetrahydrofuran type monomer with the catalyst to effect the polymerization reaction is first conducted at a low temperature (first stage), and then the temperature is elevated under the specific conditions and the polymerization is continued at such an elevated temperature (second stage). At the first stage, the reaction temperature is set within the range of −30° C. to 10° C. If the reaction temperature exceeds 10° C. at the first stage, there is substantially no improvement of catalytic efficiency and further the reaction control becomes difficult owing to the evolution of heat when mixing the tetrahydrofuran type monomer with the catalyst, resulting in an increased tendency of coloration or decomposition of the polymerization product. On the other hand, when the reaction temperature at the first stage is below −30° C., there is required a high-capacity cooling equipment and, in addition, the polymerization rate becomes very low, resulting in a reduced productivity. This is undesirable from the commercial viewpoint. Thus, in order to attain a particularly remarkable improvement of catalytic efficiency, it is desirable to control the first-stage reaction temperature within the range of −30° C. to 0° C.

Then, at the second stage, the reaction temperature is elevated to a temperature which falls within the range of 0° C. to 40° C. and is at least 10° C. higher than that at the first stage when the conversion of the monomer into the polymer has reached 5% or more, and the polymerization reaction is further continued at this temperature. If the conversion at the end of the first stage is less than 5%, there can be obtained no significant improvement of catalytic efficiency. For maximizing the improvement of catalytic efficiency, the conversion at the end of the first stage should preferably be 10% or more. On the other hand, the upper limit of conversion at the end of the first stage may be varied depending on the monomer/catalyst ratio, the molecular weight of PTMG type polyether glycol to be produced and other factors, and cannot be determined uniquely, but usually said upper limit is set taking into account the facts that too high a conversion leads to a limited improvement of catalytic efficiency and that, in the case of a high-molecular-weight material, the viscosity of the polymerization system is increased and the entire system becomes finally a solid state. When considering both the catalytic efficiency-improving effect and the operational convenience, it is desirable that the conversion at the end of the first stage be set within the following ranges depending on the number-average molecular weight of the objective PTMG type polyether glycol:

| Number-average molecular weight of PTMG type polyether glycol | Conversion at the end of the first stage (%) |
| --- | --- |
| Below 1,000 | 10–40 |
| 1,000–2,000 | 10–45 |
| Above 2,000 | 10–35 |

If the reaction temperature at the second stage is below 0° C., substantially no improvement of catalytic efficiency is obtained, and it also becomes very difficult to produce a PTMG type polyether glycol having a number-average molecular weight below 1,000. On the other hand, if the second-stage reaction temperature exceeds 40° C., the final conversion becomes low owing to the influence of chemical equilibrium of the polymerization reaction, resulting in a reduced catalytic efficiency and an increased load for the recovery and purification of the unreacted monomer. There may also take place coloration or decomposition of the polymerization product. Also, substantially no improvement of catalytic efficiency is observed when the difference between the first-stage polymerization temperature and the second-stage polymerization temperature is less than 10° C. For the reasons of maximized improvement of catalytic efficiency and operational advantages, it is desirable that the second-stage reaction temperature falls within the range of 10° C. to 40° C. and the difference between the reaction temperature at the first stage and that at the second stage is at least 15° C. The polymerization time at the second stage is not specifically defined as it is variable depending on the monomer/catalyst ratio, the reaction temperature and the other factors, but usually the best result is obtained when said polymerization time is about 1–5 hours.

The monomer used in the process of this invention is tetrahydrofuran alone or a mixture of tetrahydrofuran and other copolymerizable cyclic ether(s). Examples of the copolymerizable cyclic ethers usable in this invention are three-membered ring ethers such as ethylene oxide, propylene oxide, epichlorohydrin, etc.; four-membered ring ethers such as oxacyclobutane, 3,3-dimethyloxacyclobutane, 3,3-bis(chloromethyl)oxacyclobutane, etc.; five-membered ring ethers such as 2-methyltetrahydrofuran, 3-methyltetrahydrofuran, 2,5-dihydrofuran, etc.; tetrahydropyran; oxacycloheptane and the like. For obtaining a polyether glycol having oxytetramethylene groups as principal constituent according to this invention, said cyclic ethers copolymerizable with tetrahydrofuran are used in an amount of 100 parts by weight or less, preferably 50 parts by weight or less, per 100 parts by weight of tetrahydrofuran.

In the process of this invention, there is used a catalyst comprising fuming sulfuric acid and/or fluorosulfuric acid as a ring-opening polymerization catalyst. Used as fuming sulfuric acid for said purpose is one having a free $SO_3$ concentration of about 40% by weight or less, preferably 20–35% by weight, which is generally used for the production of PTMG-polyether glycol.

Said fuming sulfuric acid may be used alone, but, if necessary, a suitable co-catalyst may be incorporated for the purpose of increasing the polymerization rate or adjusting the molecular weight. As the co-catalyst, there may be used known ones such as perchloric acid, perchlorate, metallic fluorides, metallic borofluorides or aromatic compounds, but for the reasons of easy availability and treatment and good effect, a metallic borofluoride, particularly sodium borofluoride or potassium borofluoride is preferred. Fluorosulfuric acid is usually used singly as a ring opening polymerization catalyst, but in some cases, an open-chain carboxylic acid anhydride or the like may be incorporated.

In practicing the process of this invention, the amount of the ring-opening polymerization catalyst used is not critical, but usually such a catalyst is used in the following amount ranges: in the case of fuming sulfuric acid, it is used in an amount of 10 to 40 parts by weight per 100 parts by weight of the monomer, and in the case of further adding a co-catalyst, this co-catalyst is used in an amount of 0.05 to 20 parts by weight per 100 parts by weight of fuming sulfuric acid. In the case of fluorosulfuric acid, it is used in an amount of 1 to 20 parts by weight per 100 parts by weight of the monomer, and if necessary, an open chain carboxylic acid anhydride or the like may additionally be added in an amount of 5 to 400 parts by weight per 100 parts by weight of fluorosulfuric acid. Actually, the amount of said ring-opening polymerization catalyst used is properly selected according to the intended molecular weight of the PTMG type polyether glycol and other factors. The polymerization manner is not critical in this invention and the polymerization may be effected in a batchwise manner, a continuous manner or the like. When the polymerization is conducted in a batchwise manner, it is preferred to continuously add the ring-opening polymerization catalyst to the monomer at a suitable rate for facilitating the removal of heat of mixing. According to the process of this invention, the monomer may be polymerized in the presence of an inert solvent such as cyclohexane, dichloroethane, dichloromethane or the like, but it is preferred to conduct the polymerization without using the solvent excepting special cases.

In the (B) step, water or an aqueous alkali solution is added to the polymerization product, and under the strongly acidic condition the product is heated to hydrolyze the product. The amount of water or an aqueous alkali solution added is preferably such that the sulfuric acid concentration in the aqueous layer after the treatment is within the range of 5 to 40% by weight. If the sulfuric acid concentration exceeds 40% by weight, there is the tendency that the equilibrium conversion in the hydrolysis reaction is decreased and the amount of the residual sulfuric acid ester groups is increased. On the other hand, if the sulfuric acid concentration is less than 5% by weight, the hydrolysis reaction rate becomes low, and a long period of time is required for the treatment and a large amount of water is also required. Since the majority of the sulfuric acid ester group at the ends of the polyether is hydrolyzed by the treatment to form sulfuric acid, the sulfuric acid concentration in the aqueous layer after the treatment is substantially equal to the amount of sulfuric acid produced from the reaction between water and the amount of fuming sulfuric acid and/or fluorosulfuric acid used in the polymerization (as expressed by the following reaction formulae (1) and (2)). Therefore, the sulfuric acid concentration can be calculated from the amount of sulfuric acid used, and, if an alkali is added, deducing the amount of the sulfuric acid neutralized with the alkali from said amount.

$$H_2SO_4 \cdot xSO_3 + H_2O \rightarrow (1+x)H_2SO_4 \tag{1}$$

$$FSO_3H + H_2O \rightarrow H_2SO_4 + HF \tag{2}$$

The hydrolysis may be accomplished by adding water alone to the polymerization product, but in the case of using a ring-opening polymerization catalyst comprising fuming sulfuric acid as a principal component, a large amount of fuming sulfuric acid is used particularly in the production of a low molecular weight PTMG type polyether glycol, so that a considerably large amount of water becomes needed where water alone is added. In such a case, it is recommended to add an alkali together with the water so as to neutralize a part of the sulfuric acid. In this case, a small amount of water is sufficient and the amount of the PTMG type polyether glycol dissolved in the aqueous layer becomes small. The alkali used for said purpose may be, for example, a hydroxide or oxide of an alkali metal or an alkaline earth metal, or ammonia. An alkali metal hydroxide or oxide is preferred. The amount of the alkali used is preferably such as to be not less than ¼ of the amount required for neutralizing the mixture of water and the amount of fuming sulfuric acid and/or fluorosulfuric acid used in the polymerization but is such that the hydrolysis reaction system remains as strongly acidic as a pH of 3 or less, preferably 1 or less. Such an alkali may be added in its entire amount prior to the hydrolysis treatment, or may be added stepwise or continuously during the hydrolysis treatment.

This method enables not only the quick and perfect accomplishment of the hydrolysis of the polyether terminal groups without adding a large amount of water at the time of hydrolysis reaction but also the great decrease of the amount of the PTMG type polyether glycol dissolved in the acidic aqueous solution while maintaining an acidity required for the advancement of the hydrolysis reaction.

The hydrolysis temperature is not critical, and a temperature of not less than 50° C., particularly 50° to 150° C., is preferred. If the hydrolysis temperature is less than 50° C., the hydrolysis reaction rate is reduced to prolong the treatment time and also layer separation after the hydrolysis treatment becomes difficult, particularly in the production of a PTMG type polyether glycol having a molecular weight of 2,000 or more. On the other hand, if the hydrolysis temperature exceeds 150° C., decomposition or deterioration of the PTMG type polyether glycol tends to take place during the hydrolysis treatment, and also the corrosive action of sulfuric acid or hydrogen fluoride is intensified, so that a very constly acid-resistant material is required for the hydrolysis reactor. The most preferred range of the hydrolysis temperature is 60°–120° C. Such a hydrolysis temperature may be kept constant throughout the hydrolysis treatment, or the hydrolysis may be effected while raising or lowering the temperature stepwise or continuously with the lapse of time. The hydrolysis treatment time is also not critical and it may be varied depending on the treating temperature, the sulfuric acid concentration and the molecular weight of the PTMG type polyether glycol. The hydrolysis treatment time is usually 1–10 hours under the above-said conditions. The hydrolysis manner is also not critical in this invention, and the hydrolysis may be conducted in a batchwise manner or a continuous manner. It is also preferable to stir the reaction system by a suitable means because the polymerization product and the aqueous solution undergo a phase separation in the course of the hydrolysis treatment, whereby the system becomes heterogeneous.

The terminal sulfuric acid ester groups are converted into hydroxyl groups by this hydrolysis treatment, and in order to minimize the amount of the PTMG type polyether glycol dissolved or emulsified in the washings in the subsequent step (C), it is preferable that the amount of the residual sulfuric acid ester groups be kept not more than 100 ppm, in terms of $SO_4$, based on the weight of PTMG type polyether glycol. Moreover, it is more preferably not more than 20 ppm for minimizing the time required for the separation of the PTMG type polyether glycol layer and the aqueous layer after washing. The following methods may be cited as the preferred method of hydrolysis for minimizing the amount of residual sulfuric acid ester groups in the PTMG type polyether glycol. The first method comprises adding water to the polymerization product in such an amount that the sulfuric acid concentration in the aqueous layer after the hydrolysis treatment becomes 10–40% by weight, heating the resulting mixture with stirring at a temperature of 60°–120° C. for a period of 2–5 hours to hydrolyze the product, allowing the hydrolysis mixture to stand to cause layer-separation, withdrawing the aqueous layer, adding thereto water again in an amount of 50–200 parts by weight per 100 parts by weight of the polymer together with sulfuric acid or a part of the aqueous layer withdrawn in an amount of 1% by weight based on the weight of the water, and heating the resulting mixture with stirring at a temperature of 80°–120° C. for a period of 2–5 hours. The second method comprises adding water to the polymerization product, heating and stirring the resulting mixture under the same conditions as in the first method, to hydrolyze the polymerization product to a certain degree, adding sodium hydroxide or an aqueous solution thereof in an amount required for neutralizing approximately 90% of said sulfuric acid, and then heating with stirring the resulting mixture under the same conditions. The third method comprises adding water to the polymerization product in such an amount that acid concentration becomes 50% by weight or less, adding to the system an aqueous solution of sodium hydroxide in an amount required for neutralizing 80–95% of said sulfuric acid continuously over a period of 1–3 hours while hydrolyzing a part of the polymerization product by heating the system with stirring at a temperature of 60°–120° C., heating the system with stirring for a further 1 to 5 hours after completion of the addition to complete the hydrolysis. Other various hydrolysis methods may be used.

If an antioxidant, such as a phenolic one or an amine type one, is added to the polymerization product prior to the hydrolysis treatment, it is possible to prevent the coloration which may otherwise occur when the obtained PTMG type polyether glycol is reacted with a diisocyanate to form a polyurethane. The polymerization product contains the unreacted monomer. This unreacted monomer may be recovered by a suitable means such as distillation or the like prior to the hydrolysis treatment, and in this case, it is preferred that the unreacted monomer is recovered in the course of said hydrolysis treatment. Usually, after said hydrolysis treatment, the aqueous layer and the PTMG type polyether glycol layer are separated by a suitable means such as allowing the mixture to stand, subjecting to centrifugation, or the like, and the separated aqueous phase is then withdrawn. The temperature for the separation of layers is not critical, though a high temperature is preferred because of easier separation of layers and smaller solubility of PTMG type polyether glycol in the aqueous layer, and it is most preferable to perform the separation of layers at said hydrolysis temperature.

However, in the case of using a basic magnesium salt in the subsequent (C) step, the aqueous layer need not be withdrawn after the hydrolysis treatment and the whole system comprising the aqueous layer having added thereto the basic magnesium salt may be washed as it is.

After the separation of the aqueous layer from the PTMG type polyether glycol layer and the withdrawal of the aqueous layer, the acid in the PTMG type polyether glycol layer is removed by washing. The method of washing to remove the acid from the PTMG type polyether glycol is not critical and this may be achieved by, for example, neutralyzing the PTMG type polyether glycol layer with a solid alkali, removing the produced salt and the solid alkali by filtration and then removing the volatile matters under reduced pressure.

It is, however, important that the PTMG type polyether glycol is substantially free from the terminal sulfuric acid ester groups of polyether produced during the polymerization and from the acids produced during the hydrolysis treatment of said terminal sulfuric acid ester groups, that is to say, the residual acid content is very important. When the residual acid content is large, the PTMG type polyether glycol is decomposed upon heating, and the urethanation and esterification are hindered, whereby undesirable side reactions are caused, resulting in the problems that there cannot be produced polyurethanes, elastomeric polyesters or elastomeric polyamides excellent in physical properties. A preferred washing method for removing such terminal sulfuric acid ester groups or residual acid matters is to wash the PTMG type polyether glycol with a neutral sulfate solution or a basic magnesium salt solution. In the case of using a neutral sulfate solution as the washing solution, the neutral sulfate should be such that the aqueous solution thereof is neutral and the solubility thereof in water at the treating temperature is at least 5% by weight. As the neutral sulfate, there are preferred sodium sulfate, potassium sulfate and magnesium sulfate from the viewpoint of easy availability, low cost and waste water quality. In order to effectively perform the treatment, the amount of the sulfate solution used is preferably within the range of 20–200 parts by weight per 100 parts by weight of the PTMG type polyether glycol. The sulfate solution may be freshly prepared for said purpose, and it is also possible to use the whole or a part of the aqueous layer withdrawn after the hydrolysis treatment in the (B) step which has been neutralized precisely to neutrality with an alkali and properly adjusted in concentration. In the case of adding an alkali during the hydrolysis treatment, it is convenient to use an alkali capable of forming a water-soluble neutral sulfate, and to neutralize the withdrawn aqueous layer with the same alkali. The washing treatment with such a neutral sulfate solution is preferably performed while heating the system to a temperature of at least 50° C. If the washing treatment temperature is less than 50° C., the separation of layers after the treatment proves difficult particularly in the case of producing a PTMG type polyether glycol having a molecular weight of at least 2,000. In addition, the reduction of the amounts of residual sulfuric ester groups and residual acid matters becomes difficult. From the viewpoint of the corrosion of apparatus discussed in relation to the (B) step, the treating pressure and the like, said treatment should be conducted at a temperature of not more than 150° C., preferably not more than 120° C. The washing treatment temperature may be kept constant throughout the treatment or may be varied during the treatment. Any washing treatment time may be selected in this method depending upon the treating conditions such as treating temperature or the like, and usually, a period of about 0.5–5 hours suffices. The washing treatment may be conducted in various manners such as a batchwise manner, a continuous manner or the like, and also various types of treating apparatus may be used corresponding to the treating manners employed. In any case, it is desirable to stir the system by a suitable means.

The amounts of residual sulfuric ester groups and residual acid matters can be reduced to a very low level by one washing treatment with a neutral sulfate solution, but if necessary, this washing treatment may be repeated twice or more times to reduce the amounts of residual sulfuric ester groups and residual acid matters to substantially zero. In the case of such a multi-stage washing treatment, when a batchwise treating method is employed, the aqueous layer separated after the treatment may be used as the treating solution in the subsequent stage after neutralizing said aqueous layer precisely to neutrality with an alkali. In the case of a continuous washing treatment, the aqueous layer separated after the treatment may as it is be supplied as the treating solution for the preceding stage to effect the so-called counter-current contact type treatment. Also, the aqueous layer withdrawn from the first stage may be supplied as the treating solution into the last stage after precisely neutralizing said aqueous layer with an alkali and properly adjusting the concentration and amount thereof, thereby enabling the majority of the treating solution to be recycled and used. By employing any of these methods, it is possible to greatly reduce the amount of the neutral sulfate used in the batchwise or continuous washing treatment. There may be employed various other washing manners.

In the case of using a basic magnesium salt solution, the basic magnesium salt may be, for example, magnesium hydroxide, magnesium oxide, magnesium carbonate, basic magnesium carbonate or a mixture thereof. Usually, these basic magnesium salts are low in solubility in water, so that in the case of adding such a salt in a small quantity, it may be used in the form of an aqueous solution, but when such a salt is added in a large amount, it may be used in the form of a suspension. Also, the magnesium salts such as magnesium carbonate or basic magnesium carbonate can be appreciably increased in solubility by blowing carbon dioxide gas into the aqueous solution thereof, and the thus prepared solution can be favorably used in this invention. Said basic magnesium salt may be dissolved or suspended in water alone, but for the production of a low molecular weight PTMG type polyether glycol, said magnesium salt may be dissolved or suspended in an aqueous solution of a suitable neutral salt for avoiding any loss of polyether glycol due to dissolution in the aqueous layer. In this case, a variety of neutral salts may be used, but the above-said neutral sulfates are most preferable. In the case of using a basic magnesium salt, it is, of course, possible to add water or a neutral salt solution to the unwashed PTMG type polyether glycol and then add a solid basic magnesium salt thereto. It is desirable to use such a basic magnesium salt in excess of the amount of residual acid matters in the system so that the pH of the system will always remain 7 or more. If the pH of the system becomes less than 7 in the course of the washing treatment due to the use of too small an amount of the basic magnesium salt, it becomes difficult to surely remove the residual acid matters from the system.

The washing treatment with said basic magnesium salt solution may be accomplished by separating the layers in the system after the hydrolysis treatment, withdrawing the aqueous layer and then adding water containing a basic magnesium salt or an aqueous neutral salt solution containing a basic magnesium to the PTMG type polyether glycol layer, but in a preferred embodiment of this invention, said washing is carried out by directly adding an excess of a basic magnesium salt to keep the pH of the system above 7 without withdrawing the aqueous layer after the hydrolysis treatment. In this case, a relatively large amount of residual acid matters is contained in the aqueous layer just after the hydrolysis treatment, but it is not always necessary to neutralize the whole of the residual acid matters, but it is possible to add a basic magnesium salt of an amount sufficient to keep the pH of the system above 7 after neutralizing the aqueous layer with other alkali compounds such as sodium hydroxide, potassium hydroxide, sodium carbonate or sodium bicarbonate to such a degree that the pH of the aqueous layer remains below 7. In the case of using an alkali in an amount sufficient to neutralize a part of the sulfuric acid in the hydrolysis treatment, it is convenient to effect previously the neutralization with the same alkali. It is, of course, possible to use a basic magnesium salt as the alkali which is additionally used in the hydrolysis treatment. By such a method, it is possible to allow a neutral sulfate to exist in the aqueous layer, allowing the loss of PTMG type polyether glycol due to dissolution thereof in the aqueous layer to be greatly reduced particularly in the production of a low molecular weight PTMG type polyether glycol. Said basic magnesium salt may be used in a large excess, but in this case, a part of the magnesium salt remains undissolved because of low solubility thereof, resulting in a somewhat complicated operation. However, even in this case, the solids of the remaining basic magnesium salt can be easily separated from the PTMG type polyether glycol by a usual way such as filtration, or the like.

In performing the washing treatment according to this invention, water containing a basic magnesium salt or an aqueous neutral salt solution containing a basic magnesium salt is used usually in an amount of 10–500 parts by weight, preferably 20–200 parts by weight, per 100 parts by weight of the PTMG type polyether glycol. The treating temperature, treating time and treating method in the case of using an aqueous basic magnesium salt solution are the same as in the case of using a neutral sulfate solution. Particularly, in the case of performing washing with a neutral sulfate solution in the (C) step, the hydrolysis of the polymerization product polyether can be conducted in the region of a high sulfuric acid concentration in the aqueous layer, so that it is possible to decrease the amount of water added in the hydrolysis reaction and also there is no need of using a large-scale hydrolysis reactor. Furthermore, the loss of PTMG type polyether glycol due to its dissolution in the aqueous layer is lessened.

Also, in the case of using a basic magnesium salt in the (C) step, there is no need of withdrawing the aqueous layer after the hydrolysis but said basic magnesium salt may be added to the said aqueous layer and the resulting mixture may be, as it is, subjected to washing. Thus, the troublesome works such as separation of the aqueous layer or adjustment of the basic magnesium salt solution for washing become unnecessary.

Whichever washing method is employed in the (C) step, an alkali in an amount sufficient to neutralize a part of the sulfuric acid may, if necessary, be added along with water for the hydrolysis treatment in the (B) step, thereby further reducing the amount of water needed while also decreasing the amount of residual sulfuric ester groups. In particular, when a low molecular weight PTMG type polyether glycol having a molecular weight of 1,000 or less it is made possible to minimize the loss of the polyether glycol due to its dissolution in the aqueous layer. Further, such a solution permits very efficient extraction of the residual acid matters which are hard to extract with water, and the residual acid content can be reduced to nearly zero by repeating the washing several times. Also, the separation of layers after the treatment is very much facilitated, and further, in dissolution of the PTMG type polyether glycol in the aqueous layer during the treatment is minimized.

After completion of the said washing treatment, the aqueous layer and the PTMG type polyether glycol layer are separated in a known manner such as allowing to stand or subjecting to centrifugation, and the aqueous layer is then withdrawn. The separation of layers is preferably conducted at a high temperature as in the case of the (B) step.

Since the thus obtained PTMG type polyether glycol contains water in a fairly large amount, it is subjected to a suitable treatment such as heating under normal or reduced pressure to get rid of water and other volatile matters. Various devices such as rotary evaporator or thin film evaporator may be used for this purpose. In order to facilitate the removal of water, a small amount of a low-boiling solvent, which forms an azeotropic mixture with water, may be added, and the resulting mixture may be evaporated and dried. The removal of the volatile matters is preferably conducted under reduced pressure for preventing decomposition or deterioration of PTMG type polyether glycol at high temperatures. The resulting PTMG type polyether glycol may be immediately put to use as a starting material for the preparation of polyurethane and the like, but preferably it is further subjected to filtration with a suitable filter to eliminate the solid impurities. By conducting the filtration after perfectly removing water and volatile matters, it is possible to prevent the PTMG type polyether glycol from being contaminated by the neutral sulfate or basic magnesium salt even where the separation of layers after the washing treatment is imperfect. Such filtration is preferably performed at a high temperature of around 60°–120° C. for reducing the viscosity of the PTMG type polyether glycol and facilitating the filtration.

The present invention is described in further detail below referring to Examples, which are merely by way of illustration and not by way of limitation. In the following Examples, all of the number-average molecular weights were measured by using a vapor pressure osmometer, and the hydroxyl number (mg of KOH equivalent to OH group in 1 g of polymer) and acid number were determined by an analysis according to the method of JIS-K 1557-1970.

EXAMPLE 1

A four-necked separable flask having an internal volume of 1.2 liters and provided with a Teflon-made stirrer, a dropping funnel, a thermometer and a three-way cock was dried in vacuo and then purged with a nitrogen gas, after which 500 g of tetrahydrofuran dehydrated by molecular sieves to a water content of 80 ppm was placed in said flask and cooled to $-20°$ C. Then, 100 g of fuming sulfuric acid with a free $SO_3$ concentration of 25% by weight (hereinafter referred to as 25% fuming sulfuric acid) was dropped into said tetrahydrofuran under stirring from the dropping funnel over 40 minutes. During this dropping, the reaction mixture was cooled so that its temperature was maintained at $-20°$ C.$\pm 2°$ C. After completion of this dropwise addition of said 25% fuming sulfuric acid, the mixture was stirred and reacted at $-20°$ C. for 2 hours, and then a part of the reaction solution was sampled and the amount of unreacted tetrahydrofuran was measured by a gas chromatography to determine the conversion. It was 32%. Thereafter, the reaction mixture was heated to 10° C. and further reacted with stirring for 2 hours. The reaction mixture remained colorless throughout the reaction, and the reaction system was not solidified but maintained in a homogeneous liquid state. Then, the conversion was determined in the same manner as said above. it was 58%. After completion of the reaction, 420 g of ion exchanged water was added to the reaction mixture with stirring to terminate to a 2-liter, three-necked separable flask provided with a Teflon-made stirrer and a distilling column, and heated in an oil bath at 95° C. with stirring for 2 hours to hydrolyze the polymerization product terminals while recovering the unreacted tetrahydrofuran by distillation. After completion of the hydrolysis, stirring was stopped and the reaction mixture was allowed to stand at room temperature to cool the same. The separated aqueous layer was withdrawn and to the remaining oil layer were added 600 g of toluene and 3 g of calcium hydroxide. The resulting mixture was stirred at room temperature for one hour. Then, the mixture was subjected to a rotary evaporator to remove by distillation a part of toluene along with the residual water under reduced pressure at about 60° C. Then, the solids were removed by filtration, and the residue was again subjected to the rotary evaporator to perfectly remove the volative matters by distillation, thereby obtaining colorless PTMG. This product had a number-average molecular weight of 1,000 and a hydroxyl number of 112, and the functionality as calculated therefrom was 2.0. The catalytic efficiency $\alpha$, as calculated from the following equation (1), was 0.93.

$$\alpha = \frac{\begin{pmatrix} \text{Number of moles of PTMG type} \\ \text{polyether glycol molecules} \end{pmatrix}}{\begin{pmatrix} \text{Number of moles of SO}_3 \text{ in fuming} \\ \text{sulfuric acid used} \end{pmatrix}} \qquad (1)$$

$$= \frac{\begin{pmatrix} \text{Amount of monomer} \\ \text{used} \end{pmatrix} \times (\text{Conversion}) \times 80}{\begin{pmatrix} \text{Amount of fuming} \\ \text{sulfuric acid} \\ \text{used} \end{pmatrix} \times 25 \times \begin{pmatrix} \text{Number-average} \\ \text{molecular weight} \\ \text{of PTMG type poly-} \\ \text{ether glycol} \end{pmatrix}}$$

On the other hand, the separated aqueous layer was neutralized with sodium hydroxide pellets in a 1-liter beaker until the pH of the aqueous solution became 7, and then the aqueous solution was evaporated to dryness by means of a rotary evaporator. To the residue was added 300 ml of chloroform, and the resulting mixture was well stirred, after which the solids were removed by filtration and the filtrate was subjected to distillation under reduced pressure to remove chloroform, whereby the residual PTMG was recovered from the aqueous solution. The weight of the recovered PTMG was 19.4 g (6.7% of the amount of PTMG formed which was calculated from the conversion).

EXAMPLE 2

In the same reaction apparatus as in Example 1, to 500 g of tetrahydrofuran was dropwise added, while maintaining the same at −10° C., a solution prepared by dissolving 0.75 g of sodium borofluoride in 105 g of 25% fuming sulfuric acid over a period of 40 minutes. After completion of this dropwise addition, the mixture was further subjected to reaction at −10° C. for one hour. The conversion of tetrahydrofuran in this reaction was 40%. Then, the reaction mixture was heated to 30° C. and further reacted for 2 hours. The conversion upon the termination of this reaction was 55%. There was observed neither solidification nor coloration of the reaction system throughout the reaction. Then, the polymerization product was treated in the same manner as in Example 1 to obtain colorless PTMG. The results of the analyses of this product and the catalytic efficiency α were as shown in Table 1.

Also, PTMG was recovered from the aqueous solution in the same manner as in Example 1. The amount of the recovered PTMG was 7.0% of the amount of formed PTMG which was calculated from the conversion.

EXAMPLE 3

In the same reaction apparatus as in Example 1, 150 g of 25% fuming sulfuric acid was dropwise added over a period of one hour to 500 g of tetrahydrofuran while being maintained at −20° C., and after completion of the dropwise addition, the mixture was further subjected to reaction at −20° C. for 10 minutes. The conversion at this point was 14%. Then, the reaction temperature was elevated to 30° C. and the reaction was continued for one hour. The conversion at the end of this reaction was 47%. Neither solidification nor coloration of the reaction system was observed throughout the period of the reaction. Then, 180 g of ion exchanged water was added to the reaction mixture with stirring well to terminate the reaction, followed by addition of 145 g of a 45% by weight sodium hydroxide solution to neutralize a part of the sulfuric acid. After replacing the dropping funnel by a distilling column, the reaction mixture was heated in an oil bath at 95° C. for 2 hours to perform the hydrolysis of the polymerization product terminals while distilling off unreacted tetrahydrofuran. After completion of the reaction, the reaction product was allowed to stand at room temperature to cool the same. The separated aqueous layer was withdrawn and the residual oil layer was treated in the same manner as in Example 1 to obtain colorless liquid PTMG. The analytical results of the product and the catalytic efficiency α were as shown in Table 1.

PTMG was recovered from the aqueous solution in the same manner as in Example 1. The yield was found to be 2.1% of the amount of the PTMG formed which was calculated from the conversion.

EXAMPLE 4

To 250 g of tetrahydrofuran in a 600-liter, four-necked separable flask prepared similarly to that in Example 1 was dropwise added a solution formed by dissolving 0.75 g of sodium borofluoride in 27.5 g of 25% fuming sulfuric acid over a period of 30 minutes while keeping the tetrahydrofuran at −10° C. After completion of said dropwise addition, the mixture was subjected to reaction at −10° C. for 2 hours. The reaction mixture was then heated to 30° C. and further subjected to reaction for 2 hours. The conversion at the end of the first-stage reaction was 37% and the final conversion was 59%. Neither solidification nor coloration of the reaction system was observed throughout the reaction. After completion of the reaction, the mixture was stirred and 195 g of ion exchanged water was added thereto to terminate the reaction, followed by the same treatment as in Example 1 to obtain colorless, half-solid PTMG. The results of the analyses of this product and the catalytic efficiency α were as shown in Table 1.

Recovery of PTMG from the aqueous solution in the same way as in Example 1 was 1.1% of the amount of the PTMG formed which was calculated from the conversion.

EXAMPLE 5

To 250 g of tetrahydrofuran in the same reaction apparatus as in Example 1 was dropwise added a solution prepared by dissolving 0.75 g of sodium borofluoride in 27.5 g of 25% fuming sulfuric acid over a period of 30 minutes while keeping the tetrahydrofuran at −20° C., followed by reaction at −20° C. for 2 hours. Then, the reaction mixture was heated to 10° C. and further subjected to reaction for 2 hours. The conversion at the end of the first-stage reaction was 19% and the final conversion was 69%. Neither solidification nor coloration of the reaction mixture was observed throughout the reaction. The reaction product was treated in the same manner as in Example 1 to obtain colorless, half-solid PTMG. Its analytical results and the catalytic efficiency α were as shown in Table 1.

EXAMPLE 6

In the same reaction apparatus as in Example 1, a solution prepared by dissolving 0.82 g of potassium borofluoride in 105 g of 25% fuming sulfuric acid was drowpise added to 500 g of tetrahydrofuran at −10° C. over a period of 40 minutes, and thereafter the mixture was subjected to reaction at −10° C. for one hour. The tetrahydrofuran conversion at the end of this reaction was 38%. Then, the reaction mixture was heated to 10° C. and further subjected to reaction for 2 hours. The conversion at the end of this reaction was 60%. Neither solidification nor coloration of the reaction system was observed in the entire course of the reaction. The polymerization product was then treated in the same manner as in Example 1 to obtain colorless PTMG. Its analytical results and the catalytic efficiency α were as shown in Table 1.

COMPARATIVE EXAMPLE 1

The reaction was carried out under the same conditions as in Example 1, except that the temperature during the dropwise addition of fuming sulfuric acid was kept at 10° C. and that after said dropwise addition, the reaction was performed at the same temperature for 4 hours. The PTMG thus obtained was a light-yellow liquid, and its analytical results and the catalytic efficiency α were as shown in Table 1. Superiority of the process of this invention is clear from the comparison of the results of this Comparative Example with those of Example 1.

COMPARATIVE EXAMPLE 2

The reaction was carried out under the same conditions as in Example 1, except that at the end of the first stage reaction, the heating was not conducted and the reaction was further continued at −20° C. for 4 hours. The resultant polymerization mixture was wax-like, and stirring thereof was hardly possible. The final conversion was 45%. Colorless PTMG was recovered in the same manner as in Example 1, and its analytical results and the catalytic efficiency α were as shown in Table 1.

COMPARATIVE EXAMPLE 3

In the same reaction apparatus as in Example 1, 150 g of 25% fuming sulfuric acid was dropwise added over a period of one hour to 500 g of tetrahydrofuran maintained at 0° C., and the mixture was subjected to reaction at 0° C. for 2 hours. The reaction mixture remained liquid even after completion of the reaction, and the conversion was 68%. This reaction mixture was then treated in the same way as in Example 1, except that 630 g of ion exchanged water was added, to obtain colorless PTMG. The results of the analyses of the obtained PTMG and the catalytic efficiency α were as shown in Table 1, which indicates far lower catalyst utilization efficiency than in the process of this invention. In the hope of obtaining PTMG having a molecular weight of around 650 according to this method, experiments were carried out by changing the amount of fuming sulfuric acid used, the SO₃ concentration, the fuming sulfuric acid dropping rate and the polymerization time after dropping, but any of the resulting PTMG's had a molecular weight above 850, and it was impossible to obtain PTMG with a molecular weight of around 650.

COMPARATIVE EXAMPLE 4

The procedure of Example 3 was repeated, except that at the end of the first-stage reaction, the reaction temperature was not elevated and the reaction was continued at −20° C. for 3 hours. The reaction system was partly solidified and became white turbid at the end of this reaction. The final conversion was 58%. The obtained PTMG was colorless, and its analytical results and the catalytic efficiency α were as shown in Table 1.

COMPARATIVE EXAMPLE 5

The procedure of Example 3 was repeated, except that the temperature during dropping of fuming sulfuric acid was kept at 30° C. and that after said dropping the reaction was carried out at the same temperature for 2 hours. It was difficult to control the temperature of the reaction mixture owing to generation of heat during dropping of fuming sulfuric acid, and the reaction mixture become yellow about 5 minutes after the start of said dropping, and it was brown at the end of said dropping. The obtained PTMG was also brown, and its analytical results and the catalytic efficiency α were as shown in Table 1.

COMPARATIVE EXAMPLE 6

In the same reaction apparatus as in Example 4, a mixture of 50 g of 25% fuming sulfuric acid and 1.75 g of sodium borofluoride was dropwise added to 250 g of tetrahydrofuran at 0° C. over a period of one hour, and they were subjected to reaction at the same temperature for 2 hours. The final conversion was 66%, and the reaction system was solidified to form a wax-like mass. This product was then treated similarly to Example 4 to obtain colorless PTMG. The results of the analyses of the thus obtained PTMG and the catalytic efficiency α were as shown in Table 1.

COMPARATIVE EXAMPLE 7

In the experiment in Example 4, the heating was not conducted after the completion of the first-stage reaction and the reaction was continued at −10° C. About 5 hours after completion of the dropwise addition, the reaction system was solidified to form a wax-like mass and stirring was not possible. The reaction was stopped at this point and PTMG was recovered in the same way as in Example 4. The analytical results from this product and the catalytic efficiency α were as shown in Table 1.

COMPARATIVE EXAMPLE 8

In the experiment in Example 4, fuming sulfuric acid was added dropwise to tetrahydrofuran while maintaining its temperature at 30° C. and then the reaction was continued at said temperature for 4 hours. The experimental procedures were otherwise the same as in Example 4. The final conversion was 30%, and the recovered PTMG was light brown. Its analytical results and the catalytic efficiency α were as shown in Table 1.

COMPARATIVE EXAMPLE 9

The experiment was carried out under the same conditions as in Example 5, except that the first-stage reaction time was 30 minutes after completion of the dropwise addition and the second-stage reaction time was 2.5 hours. The conversion at the end of the first-stage reaction was 1.5% and the final conversion was 63%. The results of the analyses of the resultant product and the catalytic efficiency α were as shown in Table 1. The results show that almost no increase of catalytic efficiency is confirmed when the conversion in the first-stage reaction is less than 5%.

COMPARATIVE EXAMPLE 10

In the experiment of Example 1, the temperature during the dropwise addition of the catalyst and the reaction temperature at the first stage were maintained at 5° C. and the experiment was carried out under otherwise the same conditions. The final conversion was 46%, and the results of the analyses of the obtained colorless PTMG and the catalytic efficiency α were as shown in Table 1. The results indicate that substantially no increase of catalytic efficiency is seen when the difference between the first-stage reaction temperature and the second-stage reaction temperature is less than 10° C.

TABLE 1

| | PTMG analytical results | | | | |
|---|---|---|---|---|---|
| | Number-average molecular weight | Hydroxyl number | Functionality | Catalytic efficiency | Color tone of PTMG |
| Example | | | | | |
| 1 | 1,000 | 112 | 2.0 | 0.93 | Colorless |
| 2 | 970 | 116 | 2.0 | 0.86 | Colorless |
| 3 | 580 | 193 | 2.0 | 0.87 | Colorless |
| 4 | 1,830 | 61 | 2.0 | 0.94 | Colorless |
| 5 | 2,380 | 47 | 2.0 | 0.84 | Colorless |
| 6 | 1,090 | 103 | 2.0 | 0.87 | Colorless |
| Comp. Ex. | | | | | |
| 1 | 970 | 116 | 2.0 | 0.73 | Light-yellow |
| 2 | 1,180 | 95 | 2.0 | 0.61 | Colorless |
| 3 | 1,050 | 107 | 2.0 | 0.69 | Colorless |
| 4 | 1,040 | 108 | 2.0 | 0.59 | Colorless |
| 5 | 910 | 123 | 2.0 | 0.49 | Brown |
| 6 | 1,080 | 104 | 2.0 | 0.85 | Colorless |
| 7 | 2,520 | 45 | 2.0 | 0.60 | Colorless |
| 8 | 1,390 | 81 | 2.0 | 0.63 | Light-brown |
| 9 | 2,450 | 46 | 2.0 | 0.75 | Colorless |
| 10 | 970 | 116 | 2.0 | 0.76 | Colorless |

EXAMPLE 7

To 250 g of tetrahydrofuran in the same reaction apparatus as in Example 4, while maintaining the tetrahydrofuran at 0° C., was dropwise added 20 g of fluorosulfuric acid over a period of 30 minutes, followed by reaction at 0° C. for one hour. Then, the reaction temperature was elevated to 20° C. and the mixture was subjected to reaction for 5 hours. The conversion at the end of the first-stage reaction was 18% and the final conversion was 72%. Neither solidification nor coloration of the reaction system was observed throughout the polymerization reaction. At the end of the reaction, the mixture was stirred and 135 g of ion exchanged water was added thereto. The resulting mixture was then treated in the same manner as in Example 4 to recover colorless PTMG. This product had a number-average molecular weight of 1,880, a hydroxyl number of 60 and a functionality of 2.0. The catalytic efficiency $\beta$ as calculated from the following equation (2) was 0.96.

$$\beta = \frac{\begin{pmatrix} \text{Number of moles of } PTMG \text{ type} \\ \text{polyether glycol molecules} \end{pmatrix}}{\begin{pmatrix} \text{Number of moles of fluoro-} \\ \text{sulfuric acid used} \end{pmatrix}} \times 2 = \quad (2)$$

$$\frac{(\text{Amount of monomer used}) \times (\text{Conversion}) \times 2}{\begin{pmatrix} \text{Amount of fluoro-} \\ \text{sulfuric acid used} \end{pmatrix} \times \begin{pmatrix} \text{Number-average molecular} \\ \text{weight of } PTMG \text{ type} \\ \text{polyether glycol} \end{pmatrix}}$$

The amount (weight) of the PTMG recovered from the aqueous solution in the same manner as in Example 1 was 1.2% of the amount of the PTMG formed which was calculated from the conversion.

EXAMPLE 8

The same procedure as in Example 1 was repeated except that a mixture consisting of 225 g of tetrahydrofuran and 25 g of 3,3-dimethyloxacyclobutane was used as the monomer. The conversion at the end of the first-stage reaction was 40% and the final conversion was 64%. Neither solidification nor coloration of the reaction system was observed throughout the course of the reaction. The colorless liquid polyether glycol thus obtained had a number-average molecular weight of 2,050, a hydroxyl number of 54 and a functionality of 2.0. The catalytic efficiency α was 0.91.

Also, polyether glycol was recovered from the aqueous solution in the same manner as in Example 1. Its amount was 0.9% of the amount calculated from the conversion.

EXAMPLE 9

The same procedure as in Example 7 was repeated, except that the temperature during the dropping of fluorosulfuric acid and the reaction temperature at the first-stage reaction were both 5° C. and that the reaction time after said dropping was 40 minutes. The conversion at the end of the first-stage reaction and the final conversion were 21% and 71%, respectively, and neither solidification nor coloration of the reaction system was observed throughout the course of polymerization. The number-average molecular weight of the obtained PTMG was 1,900, the hydroxyl number was 59, the functionality was 2.0, and the catalytic efficiency $\beta$ was 0.93.

COMPARATIVE EXAMPLE 11

In the experiment in Example 7, the heating was not effected at the end of the first-stage reaction and the reaction was continued at 0° C. for 5 hours. The final conversion was 68% and the reaction system was solidified when the reaction was completed. The reaction product was treated in the same manner as in Example 7 to recover colorless PTMG. It had a number-average molecular weight of 2,020, a hydroxyl number of 52 and a functionality of 2.0, and the catalytic efficiency $\beta$ was 0.84.

COMPARATIVE EXAMPLE 12

In the experiment in Example 7, fluorosulfuric acid was added to tetrahydrofuran while maintaining the latter at 20° C. and they were reacted at the same temperature for 6 hours and then treated in the same manner as in Example 7 to obtain colorless PTMG. The final conversion was 67%, and the obtained PTMG had a number-average molecular weight of 1,930, a hydroxyl number of 58 and a functionality of 2.0. The catalytic efficiency $\beta$ was 0.87.

EXAMPLE 10

After the polymerization was conducted under the same conditions as in Example 1, the dropping funnel was replaced by the distilling column, and a solution prepared by dissolving 43 g of sodium hydroxide in 210 g of water (neutralization rate: 50%, equivalent to the sulfuric acid concentration of 20% after the treatment) was added to the contents in the apparatus with vegorous stirring. Then the mixture was heated with stirring in an oil bath at 95° C. for 2 hours to conduct the hydrolysis reaction while recovering the unreacted tetrahydrofuran. After the reaction, the stirring was stopped and the reaction mixture was allowed to stand at room temperature to cool the same, whereby the mixture was separated into two layers. Thereafter, the same treatment as in Example 1 was repeated to recover PTMG from the oil layer and also from the aqueous solution. The former had a number-average molecular weight of 960, a hydroxyl number of 117 and a functionality of 2.0. The amount of the PTMG recovered from the aqueous solution was 0.8% of the amount of PTMG formed which was calculated from the conversion.

EXAMPLE 11

The polymerization was performed under the same conditions as in Example 2 and the resulting product was treated in the same manner as in Example 10. The PTMG recovered from the oil layer had a number-average molecular weight of 930 and a hydroxyl number of 121, and the amount of the PTMG recovered from the aqueous solution was 0.7% of the PTMG formed which was calculated from the conversion.

EXAMPLE 12

After the polymerization was conducted under the same conditions as in Example 4, the dropping funnel was replaced by the distilling column and then 250 g of ion exchanged water and 25 g of a 48% by weight sodium hydroxide solution were added, followed by the same treatment as in Example 10. The PTMG recovered from the oil layer had a number-average molecular weight of 1,840 and a hydroxyl number of 61 while the amount of the PTMG recovered from the aqueous solution was 0.1% of the amount of the PTMG formed which was calculated from the conversion.

EXAMPLE 13

After the polymerization was conducted under the same conditions as in Example 7, 100 g of ion exchanged water and 25 g of a 48% by weight sodium hydroxide solution were added and the reaction mixture was treated in the same manner as in Example 10.

The amount of the PTMG recovered from the aqueous solution was 0.1% of the amount of PTMG formed which was calculated from the conversion and the analytical values of PTMG recovered from the oil layer were the same as those in Example 7.

EXAMPLE 14

After the polymerization was conducted under the same conditions as in Example 8, 250 g of ion exchanged water and 25 g of a 48% by weight sodium hydroxide solution were added and thereafter the same treatment as in Example 10 was conducted.

The amount of the PTMG recovered from the aqueous solution was 0.1% of the PTMG formed which was calculated from the conversion, and the analytical values of PTMG recovered from the oil layer were identical with those of Example 8.

EXAMPLE 15

A four-necked separable flask having an internal capacity of 2 liters and equipped with a glass-made stirrer, a dropping funnel, a thermometer and a three-way cock was dried in vacuo and then filled with dry nitrogen gas. In this flask was placed 600 g of tetrahydrofuran which had been distilled, dehydrated and cooled to −10° C., and then 66 g of 25% fuming sulfuric acid having dissolved therein 1.8 g of sodium borofluoride was dropwise added to said tetrahydrofuran with stirring from the dropping funnel over 30 minutes. During this dropwise addition, the cooling was controlled to maintain the internal temperature at −10° C. After said dropwise addition, the mixture was subjected to reaction at −10° C. for one hour and the conversion was determined. It was 21%. Then, the reaction mixture was heated to 20° C. and subjected to reaction for 2 hours. The final conversion was 60%. After completion of the reaction, 5 g of water was added to terminate the polymerization. To the polymerization product was added 280 g of water (the sulfuric acid concentration after the treatment was about 20% by weight), and the dropping funnel was replaced by the distilling column, after which the flask was immersed in an oil bath at 90° C. and the contents therein were vigorously stirred and heated for 2 hours to hydrolyze the product while recovering the unreacted tetrahydrofuran by distillation. After this treatment, stirring was stopped and the flask was allowed to stand in the oil bath. After the contents were separated perfectly into two layers, the aqueous layer was withdrawn. To the residual PTMG layer was added 350 g of a 20% by weight sodium sulfate solution, and then heated at 120° C. for 2 hours, followed by a washing treatment and recovery of unreacted tetrahydrofuran. After separating and withdrawing the aqueous layer, to the residue was again added 200 g of a 20% by weight sodium sulfate solution, heated at 95° C. for 2 hours and then washed. After the contents were perfectly separated into two layers, the aqueous layer was withdrawn and then the volatile matters were perfectly removed from the PTMG layer by using a rotary evaporator under reduced pressure at 80° C. The number-average molecular weight, hydroxyl number, acid number, amount of residual sulfuric ester groups and amount of residual acid matters of the obtained PTMG are shown in Table 2.

Method for determination of the contents of sulfuric ester groups and residual acid matters in PTMG type polyether glycol About 5 g of PTMG specimen was accurately weighed and put in a cell for colorimetric titration and then 5 ml of 0.01 N hydrochloric acid and 50 ml of isopropyl alcohol were added thereto to form a homogeneous solution. The sulfate ions in this solution were subjected to colorimetric titration with a 0.01 N barium perchlorate solution according to Japan Rubber Association Standards SRIS 3401-1976 using carboxyarsenazo as indicator to determine the sulfate ion content A (ppm) in the PTMG type polyether glycol. Separately, about 5 g of the specimen was accurately weighed and put in a 100-ml flask provided with a reflux cooler, and after adding thereto 5 ml of 0.01 N hydrochloric acid, the mixture was heated with stirring at 100° C. for 2 hours. After being cooled to room temperature, the contents were transferred to the cell for colorimetric titration using 50 ml of isopropyl alcohol and subjected to colorimetric titration in the same way as above to determine the sulfate ion content B (ppm) in the PTMG type polyether glycol. The amount of the residual sulfuric ester is given by (B−A) and the amount of residual acid matters (and salts) is given by A. The amounts of residual sulfuric ester and residual acid matters were all determined by this method in the experiments described below.

EXAMPLE 16

In the same reaction apparatus as in Example 15, 126 g of 25% fuming sulfuric acid containing 0.9 g of sodium borofluoride was dropped from the dropping funnel into 600 g of tetrahydrofuran at −10° C. with stirring over 40 minutes, after which the resulting mixture was subjected to reaction at −10° C. for one hour. The conversion at the end of this reaction was 39%. Then, the reaction mixture was heated to 30° C. and subjected to reaction at this temperature for 2 hours, after which 10 g of water was added to the mixture to terminate the polymerization. The final conversion was 60%. Then, 530 g of water was added (sulfuric acid concentration was about 20%), and the reaction solution was heated and hydrolyzed in an oil bath at 80° C. while distilling off the unreacted tetrahydrofuran in the same manner as in Example 1, and then 204 g of a 48% by weight sodium hydroxide solution (corresponding to 90% neutralization degree) was added continuously over a period of one hour while the internal temperature was kept at 100° C. to continue the hydrolysis. The recovery of unreacted tetrahydrofuran by distillation was continued during these operations. Then, in the same manner as in Example 1, the reaction mixture was allowed to stand to cause separation of layers, after which the aqueous layer was withdrawn. The PTMG layer was washed at 80° C. for one hour with 350 g of a 20% by weight aqueous sodium sulfate solution. After separating and withdrawing the aqueous layer again, the volatile matters were removed in the same manner as in the foregoing Examples and the residue was filtered through a 10-μ mesh membrane filter to obtain PTMG. The results of the analyses of the thus obtained PTMG were as shown in Table 2.

EXAMPLE 17

In the same reaction apparatus as in Example 15, 120 g of 25% fuming sulfuric acid was dropped from the dropping funnel into 600 g of tetrahydrofuran at −20° C. with stirring over a period of 40 minutes, and then the resulting mixture was subjected to reaction at −20° C. for 2 hours. The conversion at the end of this reaction was 32%. Then, the internal temperature was elevated to 10° C., at which the mixture was subjected to reaction for 2 hours. Thereafter, 10 g of water was added to terminate the polymerization. The final conversion was 57%. Then, the dropping funnel was replaced by the distilling column, and the contents in the apparatus were stirred vigorously and mixed with a solution prepared by dissolving 52 g of sodium hydroxide in 250 g of water (neutralization degree: 50%, corresponding to 20% by weight sulfuric acid concentration), and the mixture was heated and hydrolyzed in an oil bath at 80° C. for 2 hours while recovering unreacted tetrahydrofuran. In the same manner as in Example 15, the reaction mixture was allowed to stand to cause separation of layers. The aqueous layer was withdrawn and the PTMG layer was subjected twice to a heating and washing treatment with 300 g of a 15% by weight sodium sulfate solution at 120° C. The residual unreacted tetrahydrofuran was recovered in the first treatment. Thereafter, the same treatment as in Example 15 was conducted and finally the reaction product was filtered through a 10-μ mesh membrane filter to obtain PTMG. The results of analyses thereof were as shown in Table 2.

EXAMPLE 18

In the experiment in Example 17, the amount of 25% fuming sulfuric acid was changed to 180 g and the dropping thereof was conducted over one hour. The conversion after this treatment was 12%. Upon completion of said dropping, the internal temperature was elevated to 30° C. and the reaction was continued for one hour. Then, 130 g of water was added to terminate the polymerization and the conversion was measured. It was 52%. After replacing the dropping funnel by the distilling column, a solution prepared by dissolving 101 g of sodium hydroxide in 130 g of water was added continuously over one hour and heated in an oil bath at 80° C., and after said addition, the mixture was further heated and hydrolyzed at 80° C. for one hour. Unreacted tetrahydrofuran was simultaneously recovered by distillation during this operation. Then, a solution prepared by dissolving 23 g of sodium hydroxide in 25 g of water was added again continuously over one hour. At the same time, the oil bath temperature was raised to 100° C., and the mixture was heated and hydrolyzed while recovering unreacted tetrahydrofuran. After this treatment, the reaction mixture was allowed to stand to cause separation of layers, after which approximately 90% of the aqueous layer was taken out, and to the residue was added 150 g of a 20% by weight aqueous sodium sulfate solution and the resulting mixture was subjected to a heating and washing treatment at 100° C. for 2 hours. Then, in the same manner as in the preceding Examples, the aqueous layer was removed and the PTMG layer was again subjected to a heating and washing treatment at 80° C. for 30 minutes, after which the same operation was repeated once more. The resulting product was treated in the same way as in Example 17 to obtain PTMG. The results of its analyses are shown in Table 2.

EXAMPLE 19

The same experimental procedures as in Example 17 was repeated till the stage of separation of the aqueous layer after the heating and hydrolysis treatment at 80° C. with a sodium hydroxide solution. Thereafter, the withdrawn aqueous layer was neutralized with a 10% by weight aqueous sodium hydroxide solution till the pH of the solution became nearly 6. After further adding a 1% by weight aqueous sodium carbonate solution until the pH of the solution reached 7, water was added to adjust the sodium sulfate concentration in the solution to 15% by weight, and then by using 300-g portions of the obtained solution instead of the sodium sulfate solution, the same washing treatment as in Example 17 was carried out. The results of the analyses of the thus obtained PTMG were as shown in Table 2.

EXAMPLE 20

In the same procedure as in Example 17, the aqueous layer withdrawn after the first washing treatment with a sodium sulfate solution was neutralized to a pH of 7 by using a 1% by weight aqueous sodium carbonate solution, and the obtained solution was added to the PTMG layer followed by the same washing treatment as in Example 17 to obtain PTMG. The results of its analyses are shown in Table 2.

EXAMPLE 21

The same procedure as in Example 16 was repeated, except that 300 g of a 20% by weight aqueous magnesium sulfate solution was substituted for the sodium sulfate solution, and the obtained PTMG was analyzed in the same manner as in the foregoing Examples to obtain the results shown in Table 2.

EXAMPLE 22

The same procedure as in Example 15 was repeated, except that a mixture consisting of 500 g of tetrahydrofuran and 100 g of 3,3-dimethyloxacyclobutane was substituted for the tetrahydrofuran alone. In this case, the conversion by the reaction at $-10°$ C. was 41% and the final conversion was 72%. The results of the analyses of the obtained copolymerized polyether glycol were as shown in Table 2.

TABLE 2

| | Analytical results of PTMG type of polyether glycol | | | | |
|---|---|---|---|---|---|
| Example No. | Number-average molecular weight | Hydroxyl number (mgKOH/g) | Acid number (mgKOH/g) | Amount of sulfuric ester groups (ppm*1) | Amount of residual acid matters (ppm*1) |
| 15 | 1,910 | 59.3 | 0.023 | <3*2 | 5 |
| 16 | 980 | 115 | 0.025 | <3*2 | <3*2 |
| 17 | 990 | 112 | 0.022 | <3*2 | <3*2 |
| 18 | 690 | 165 | 0.025 | 5 | <3*2 |
| 19 | 990 | 113 | 0.015 | 5 | 6 |
| 20 | 990 | 112 | 0.024 | <3*2 | <3*2 |
| 21 | 970 | 115 | 0.033 | 6 | <3*2 |
| 22 | 2,320 | 48.8 | 0.016 | <3*2 | <3*2 |

Note:
*1Content (ppm) in terms of $SO_4^{2\ominus}$ in PTMG type polyether glycol.
*2Below analytical limits

EXAMPLE 23

In the same reaction apparatus as in Example 15, 100 g of 25% fuming sulfuric acid was dropped into 500 g of tetrahydrofuran at $-20°$ C. over 40 minutes, and then the resulting mixture was subjected to reaction at $-20°$ C. for 2 hours. The conversion at this point was 31%. Then the reaction mixture was heated to 10° C. and subjected to reaction for 2 hours, after which 10 g of water was added to the mixture to terminate the polymerization. The final conversion was 58%. Thereafter, 400 g of water was added to the polymerization mixture, and the dropping funnel was replaced by the distilling column, after which the contents in the flask were heated and hydrolyzed in an oil bath at 100° C. with stirring for 2 hours while distilling off and recovering unreacted tetrahydrofuran. Then, the contents in the flask were allowed to stand at 100° C. to cause separation of layers and the aqueous layer was withdrawn. To the obtained PTMG layer were again added 230 g of water and 20 g of the withdrawn aqueous layer, and the resulting mixture was refluxed with heating and hydrolyzed in an oil bath at 120° C. with stirring for 2 hours and then allowed to stand at 100° C. to cause separation of layers, after which the separated aqueous layer was withdrawn. The amount of residual sulfuric ester groups in PTMG was 5 ppm and the acid number was 0.21. To the resulting PTMG layer was further added 250 g of water having suspended therein 0.25 g of basic magnesium carbonate, and the resulting mixture was subjected to heating and washing treatment in an oil bath at 100° C. for one hour while stirring the mixture vigorously, after which the mixture was allowed to stand to cause separation of layers. The mixture was not emulsified throughout the treatment, and upon allowing the mixture to stand, the mixture underwent separation of layers in a very short time, and the PTMG layer after the separation of layers was almost transparent. After removing the aqueous layer, the PTMG layer was subjected to perfect evaporation of volatile matters under reduced pressure at 80° C., and then filtered through a 10-$\mu$ mesh membrane filter to obtain 260 g of colorless transparent PTMG (yield: 52%). The thus obtained PTMG was analyzed to determine its number-average molecular weight, hydroxyl number, acid number, and amount of residual sulfuric ester groups, all of which are shown in Table 3.

EXAMPLE 24

The same procedure as in Example 23 was repeated, except that 0.15 g of magnesium hydroxide was substituted for the basic magnesium carbonate. The analytical results of the resulting PTMG were as shown in Table 3.

EXAMPLE 25

The same procedure as in Example 23 was repeated, except that the water having suspended therein basic magnesium carbonate was replaced by solution prepared by blowing an appropriate amount of carbon dioxide gas into water having suspended therein 0.25 g of magnesium carbonate. The resulting PTMG was analyzed to obtain the results shown in Table 3.

EXAMPLE 26

440 g of water was added to the polymerization product obtained by effecting the polymerization under the same conditions as in Example 23, and the mixture was heated and hydrolyzed in an oil bath at 80° C. with stirring for one hour while recovering the unreacted tetrahydrofuran. Then, the oil bath temperature was elevated to 100° C. and 170 g of a 48% by weight sodium hydroxide solution was added continuously over a period of one hour, and the mixture was further stirred and hydrolyzed at 100° C. for 2 hours while recovering the unreacted tetrahydrofuran and then allowed to stand at 100° C. to cause separation of layers. A part of the separated PTMG layer was sampled and the amount of residual sulfuric ester groups and acid value were measured. They were below 3 ppm and 0.25, respectively. Then, 5.4 g of solid basic magnesium carbonate was added to the system without withdrawing the aqueous layer and the system was stirred gently. Consequently, the best portion of the solids were dissolved in the aqueous layer and the pH of the mixture became 8. Then, the system was heated in an oil bath at 80° C. for 2 hours, washed with stirring and then allowed to stand at 80° C. to cause separation of layers. The pH of the system remained around 8 throughout these treatments. Also, the system stayed free of emulsification and substantially no difficulty was met for separation of layers, and the PTMG layer separated was almost transparent. This PTMG layer was treated in the same manner as in Example 17 to obtain PTMG and the latter was analyzed to obtain the results shown in Table 3.

EXAMPLE 27

The same procedure as in Example 26 was repeated till the hydrolysis treatment, and thereafter, without withdrawing the aqueous layer, 21 g of a 20% by weight aqueous sodium hydroxide solution was added and the mixture was heated in an oil bath at 80° C. with stirring for about 20 minutes. The pH of the mixture at this point was about 5. Then 1.5 g of a 15% by weight basic magnesium carbonate suspension in water was added and the mixed system was heated and washed with stirring at 80° C. for one hour and then allowed to stand to cause separation of layers. The pH of the mixture stayed around 8 throughout the treatment, the mixture remained free of emulsification, the separation of layers occured easily, and the separated PTMG layer was almost transparent. PTMG was obtained by the same treatment as in Example 17 and analyzed in the same manner as in Example 17 to obtain the results shown in Table 3.

pH of the mixture about 8, followed by additional heating and washing with stirring in an oil bath at 80° C. for 2 hours. Then, the mixture was allowed to stand to cause separation of layers. The mixture showed no emulsification phenomenon throughout the treatment, the separation of layers was easy, and the separated PTMG layer was only slightly turbid. After removing the aqueous layer, the remaining PTMG layer was treated in the same manner as in Example 17 to obtain PTMG. Its analytical results are shown in Table 3.

TABLE 3

| | Analytical results of PTMG type polyether glycol | | | | | |
|---|---|---|---|---|---|---|
| Example No. | Number-average molecular weight | Hydroxyl number (mgKOH/g) | Acid number (mgKOH/g) | Amount of residual sulfuric ester groups (ppm*1) | Separation of layers after washing | Amount of residual acid matters (ppm*1) |
| 23 | 980 | 116 | 0.025 | 4 | Separated in short time | 6 |
| 24 | 980 | 115 | 0.024 | 5 | Separated in short time | 4 |
| 25 | 970 | 115 | 0.020 | <3*2 | Separated in short time | <3*2 |
| 26 | 970 | 116 | 0.018 | <3*2 | Separated in short time | <3*2 |
| 27 | 970 | 116 | 0.020 | <3*2 | Separated in short time | <3*2 |
| 28 | 1,940 | 57.9 | 0.030 | 4 | Separated in short time | 5 |

Note:
*1, *2 See Table 2.

EXAMPLE 28

In the same manner as in Example 17, a solution prepared by dissolving 1.5 g of sodium borofluoride in 55 g of 25% fuming sulfuric acid was dropped into 500 g of tetrahydrofuran at −10° C. over 30 minutes, and the mixture was subjected to reaction at −10° C. for one hour. The conversion at this point was 20%. Then the reaction mixture was heated to 20° C. and subjected to reaction at this temperature for 2 hours. The final conversion was 61%. Then, to the polymerization product was added 520 g of water and heated in an oil bath at 80° C. with stirring for 2 hours while distilling off and recovering the unreacted tetrahydrofuran. Then, the oil bath temperature was elevated to 100° C. and 50 g of a 48% by weight aqueous sodium hydroxide solution was added continuously over a period of one hour to accomplish the hydrolysis of the reaction mixture. Recovery of the unreacted tetrahydrofuran was continued during said addition, and upon completion of said addition, the mixture was allowed to stand at 100° C. to cause the separation of layers. The aqueous layer was withdrawn, and to the remaining PTMG layer was added 250 g of water and a part of the withdrawn aqueous layer, after which the sulfuric acid concentration in the aqueous layer was adjusted to about 1% by weight, and the mixture was again heated and stirred in an oil bath at 100° C. for 2 hours to complete the hydrolysis and then allowed to stand at 100° C. to cause separation of layers. A part of the separated PTMG layer was sampled and analyzed to determined the amount of residual sulfuric ester groups and acid number. They were 4 ppm and 0.27, respectively. Then, without withdrawing the aqueous layer, 9.7 g of a 20% by weight aqueous sodium hydroxide solution was added and the mixed system was heated and stirred in an oil bath at 80° C. for about 15 minutes and then, 1.3 g of a 15% by weight aqueous suspension of a basic magnesium carbonate to adjust the

What is claimed is:

1. A process for preparing polyether glycol, comprising (A) polymerizing tetrahydrofuran or a mixture of tetrahydrofuran and other copolymerizable cyclic ether(s) in the presence of a ring-opening polymerization catalyst comprising as principal components fuming sulfuric acid and/or fluorosulfuric acid, (B) adding water or an aqueous alkali solution to the polymerization product, hydrolyzing the said product under the strongly acidic condition, and (C) washing the hydrolysis product, characterized in that the polymerization of tetrahydrofuran or a mixture of tetrahydrofuran and other copolymerizable cyclic ether(s) is conducted by (1) contacting the monomer with the ring-opening polymerization catalyst at a temperature within the range of −30° C. to 10° C. at the first stage and (2) elevating the reaction temperature, when the conversion of said monomer into the polymer has reached 5% or more, to a temperature which falls within the range of 0° C. to 40° C. and is at least 10° C. higher than the reaction temperature at the first stage and continuing the polymerization reaction at the elevated temperature.

2. The process according to claim 1, wherein the reaction temperature at the first stage is from −30° C. to 0° C.

3. The process according to claim 1 or 2, wherein when the conversion has reached 10% or more, the reaction temperature is elevated to a temperature which falls within the range of from 10° C. to 40° C. and is at least 15° C. higher than the reaction temperature at the first stage.

4. The process according to claim 1, wherein the hydrolysis in the step (B) is conducted under the addition of an alkali to the hydrolysis reaction system in an amount which is ¼ or more of the amount necessary for neutralizing the amount of the mixture of water and fuming sulfuric acid and/or fluorosulfuric acid used in the polymerization and which is sufficient to keep the pH of the hydrolysis reaction system at 3 or less.

5. The process according to claim 4, wherein the alkali is added in its entire amount prior to the hydrolysis treatment or it is added stepwise or continuously during the hydrolysis treatment.

6. The process according to claim 1 or 4, wherein the hydrolysis temperature in the step (B) is from 50° C. to 150° C.

7. The process according to claim 1 or 4, wherein the hydrolysis product, that is, polytetramethylene glycol or polyether glycol having oxytetramethylene groups as principal constituent is washed with an aqueous neutral sulfate solution or an aqueous basic magnesium salt solution.

8. The process according to claim 7, wherein the aqueous neutral sulfate solution is an aqueous solution of sodium sulfate, potassium sulfate or magnesium sulfate.

9. The process according to claim 7, wherein the amount of the aqueous neutral sulfate solution is 20-200 parts by weight per 100 parts by weight of polytetramethylene glycol or polyether glycol having oxytetramethylene groups as principal constituent.

10. The process according to claim 7, wherein washing with the aqueous neutral sulfate solution is performed while heating the system at a temperature of from 50° C. to 150° C.

11. The process according to claim 7, wherein the aqueous basic magnesium salt solution is an aqueous solution of magnesium hydroxide, magnesium oxide, magnesium carbonate, basic magnesium carbonate or a mixture thereof.

12. The process according to claim 11, wherein the amount of the aqueous basic magnesium salt solution is 10-500 parts by weight per 100 parts by weight of polytetramethylene glycol or polyether glycol having oxytetramethylene groups as principal constituent.

13. The process according to claim 1, wherein said other copolymerizable cyclic ether to be mixed with tetrahydrofuran is selected from the group consisting of ethylene oxide, propylene oxide, epichlorohydrin, oxacyclobutane, 3,3-dimethyloxacyclobutane, 3,3-bis(chloromethyl)oxacyclobutane, 2-methyltetrahydrofuran, 3-methyltetrahydrofuran, 2,5-dihydrofuran, tetrahydropyran and oxacycloheptane.

14. The process according to claim 13, wherein the amount of the cyclic ether used is 100 parts by weight or less per 100 parts by weight of tetrahydrofuran.

* * * * *